United States Patent
Fujii et al.

(10) Patent No.: US 8,738,249 B2
(45) Date of Patent: May 27, 2014

(54) SYNCHRONOUS AUTOMATIC TRANSMISSION UP-SHIFT CONTROL UTILIZING INPUT TORQUE SIGNAL

(75) Inventors: Yuji Fujii, Ann Arbor, MI (US); Bradley Dean Riedle, Northville, MI (US); Seung Hoon Lee, Northville, MI (US); Gregory Michael Pietron, Canton, MI (US); Diana Yanakiev, Birmingham, MI (US); Joseph F. Kucharski, Livonia, MI (US); Nimrod Kapas, Dearborn, MI (US); Hongtei Eric Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 747 days.

(21) Appl. No.: 12/949,990

(22) Filed: Nov. 19, 2010

(65) Prior Publication Data

US 2012/0130608 A1 May 24, 2012

(51) Int. Cl.
*G06F 7/00* (2006.01)
*G06F 17/00* (2006.01)
*G06F 19/00* (2011.01)

(52) U.S. Cl.
USPC .......................................................... 701/54

(58) Field of Classification Search
CPC ................................................ F16H 2342/044
USPC .......................................... 701/51, 54–56, 58
See application file for complete search history.

(56) References Cited

U.S. PATENT DOCUMENTS

| | | | |
|---|---|---|---|
| 4,576,265 A | 3/1986 | Kumura et al. | |
| 4,653,621 A | 3/1987 | Oshiage | |
| 4,724,723 A * | 2/1988 | Lockhart et al. | 477/102 |
| 6,243,637 B1 * | 6/2001 | Minowa et al. | 701/51 |
| 6,364,811 B1 | 4/2002 | Hubbard et al. | |
| 6,487,925 B2 | 12/2002 | Fischer et al. | |
| 6,909,955 B2 * | 6/2005 | Vukovich et al. | 701/51 |
| 6,991,584 B2 | 1/2006 | Cowan | |
| 7,125,364 B2 | 10/2006 | Cring | |
| 7,351,183 B2 | 4/2008 | Fujii et al. | |
| 7,445,581 B2 | 11/2008 | Cring | |
| 8,296,024 B2 * | 10/2012 | Stoller et al. | 701/60 |
| 2003/0163235 A1 | 8/2003 | Tokura et al. | |
| 2006/0135316 A1 * | 6/2006 | Fujii et al. | 477/156 |
| 2008/0139362 A1 * | 6/2008 | Fujii et al. | 477/109 |
| 2009/0013803 A1 * | 1/2009 | Lohr et al. | 73/862.338 |
| 2009/0112416 A1 * | 4/2009 | Heap et al. | 701/54 |
| 2009/0118931 A1 * | 5/2009 | Kaminsky et al. | 701/54 |
| 2010/0262344 A1 * | 10/2010 | Fujii et al. | 701/55 |
| 2010/0318269 A1 * | 12/2010 | Yanakiev et al. | 701/55 |
| 2011/0184613 A1 * | 7/2011 | Fujii et al. | 701/54 |
| 2011/0264342 A1 * | 10/2011 | Baur et al. | 701/54 |
| 2013/0085647 A1 * | 4/2013 | Lister et al. | 701/55 |

* cited by examiner

*Primary Examiner* — Khoi Tran
*Assistant Examiner* — Harry Oh
(74) *Attorney, Agent, or Firm* — James Dottavio; Brooks Kushman P.C.

(57) ABSTRACT

A synchronous automatic transmission up-shift control utilizes input torque measurements. The input torque is measured during an up-shift having preparatory, torque, and inertia phases. Target input torque profiles for the torque and inertia phases are determined based on the input torque during the preparatory phase. During the torque phase, an engine torque is controlled to cause the input torque to achieve the target profile for the torque phase. During the inertia phase, an on-coming clutch is controlled to cause the input torque to achieve the target profile for the inertia phase.

20 Claims, 7 Drawing Sheets

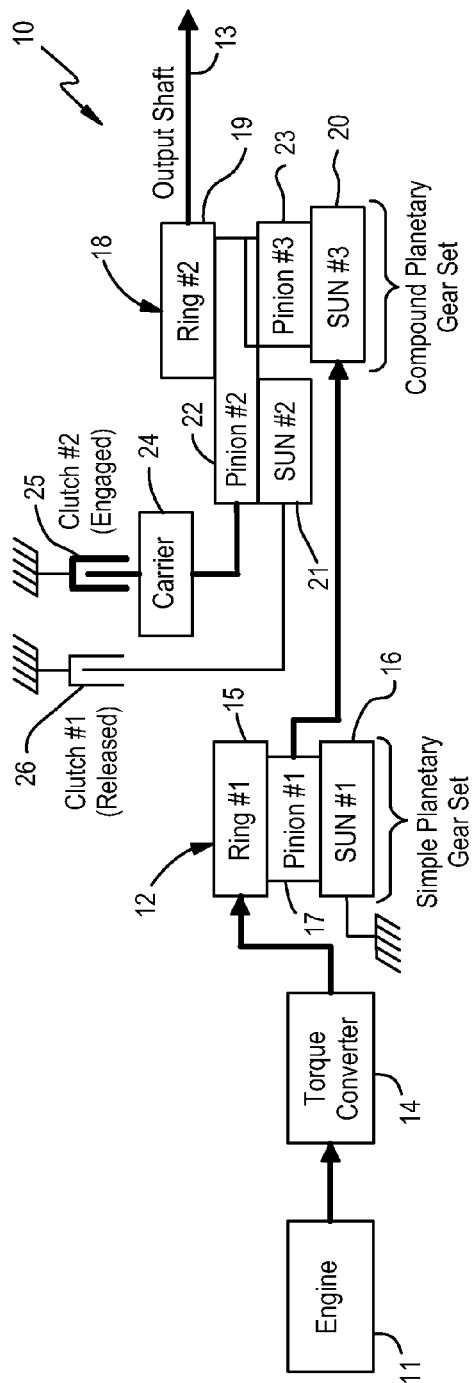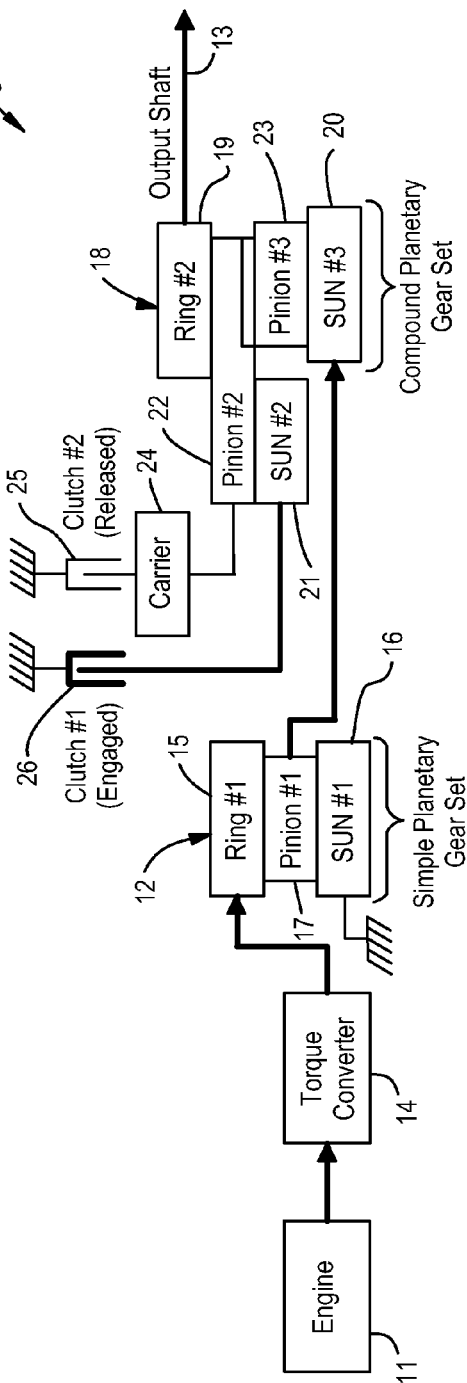

SYNCHRONOUS AUTOMATIC TRANSMISSION UP-SHIFT CONTROL UTILIZING INPUT TORQUE SIGNAL

BACKGROUND

1. Technical Field

The present invention relates to multiple ratio geared transmissions for use in an automotive vehicle powertrain and to a control strategy for effecting engagement and release of transmission friction torque establishing elements during a ratio change.

2. Background Art

A multiple-ratio (i.e., step-ratio) automatic transmission in an automotive vehicle powertrain adjusts a gear ratio between a torque source and a driveshaft to meet drive-ability requirements under dynamically-changing driving conditions. Ratio changes are achieved by engaging a so-called on-coming clutch ("OCC") as a so-called off-going clutch ("OGC") is released. The clutches, which may be referred to as transmission friction elements or brakes, establish and disestablish power flow paths from an internal combustion engine to vehicle traction wheels. During acceleration of the vehicle, the overall speed ratio, which is the ratio of transmission input shaft speed to transmission output shaft speed, is reduced as vehicle speed increases for a given engine throttle setting. This is an up-shift.

In the case of a synchronous up-shift, the OCC engages to lower both the gear ratio (i.e., the overall speed ratio) and the torque ratio (the ratio of output torque to input torque). The synchronous up-shift event can be divided into three phases, which may be referred to as a preparatory phase, a torque phase, and an inertia phase. The torque phase is a time period when the OGC torque is controlled to decrease toward a non-significant level with an intention to disengage it. Simultaneously, during the torque phase, the OCC is controlled to increase from a non-significant level, thereby initiating the OCC engagement according to a conventional up-shift control. The clutch engagement and disengagement timing results in a momentary activation of two torque flow paths through the gearing, thereby causing torque delivery to drop momentarily at the transmission output shaft. This condition, which can be referred to as a "torque hole," occurs before the OGC disengages. A vehicle occupant can perceive a large torque hole as an unpleasant shift shock. The preparatory phase is a time period prior to the torque phase. The inertia phase is a time period when the OGC starts to slip due to substantially reduced holding capacity, following the torque phase.

The release timing of the OGC has to be synchronized with a certain OCC torque level at the end of the torque phase. Missed synchronization leads to inconsistent shift quality, often resulting in audible engine flair or gear-set tie-up with a deeper and wider torque hole.

Certain controls employ an open-loop approach for OCC engagement and OGC release control. This open-loop approach requires manual adjustment of OCC and OGC control parameters under multiple operating conditions. As a result, a manufacturer building a vehicle having the transmission has to carry out a relatively long shift quality calibration process for each vehicle program. It is also difficult to account for variability in actuator characteristics and dynamically changing operating conditions, resulting in inconsistent shift quality.

Other controls employ a closed-loop method to consistently release the OGC at an ideal timing based on direct or indirect measurements of OGC torque. However, this closed-loop method does not provide a solution to mitigate a torque hole.

Other control techniques employ a coupled engine-transmission control during the torque phase to reduce or eliminate torque holes. However, in practice, it is difficult to simultaneously synchronize the behaviors of three actuators (i.e., the engine, the OCC, and the OGC) due to their finite controllability in conjunction with the presence of various noise factors. In order to improve the control robustness, certain control techniques aim at reducing errors between target OCC and OGC torques as compared with those derived from torque sensor measurements within a transmission system. However, engine and transmission controls still remain tightly coupled through kinematic constraints. Synchronization or coupling between engine torque control, OCC engagement control, and OGC release control is still required.

In view of the foregoing, there is a need to reduce the complexity of an up-shift control for improved shift consistency and control robustness.

SUMMARY

In at least one embodiment, a method for an automatic transmission is provided. The transmission has gearing defining multiple torque flow paths from an input shaft to an output shaft and further has an off-going clutch ("OGC") and an on-coming clutch ("OCC") for shifting from a low gear configuration to a high gear configuration during a ratio up-shift event having a preparatory phase, a torque phase, and an inertia phase. The method includes, during the up-shift event, measuring input torque using an input torque sensor in communication with the input shaft. The method includes determining a target input torque profile for the torque phase and a target input torque profile for the inertia phase each based on the input torque measured during the preparatory phase. The method includes, during the torque phase, controlling an engine torque to cause the input torque to achieve the target input torque profile for the torque phase. The method includes, during the inertia phase, controlling the OCC to cause the input torque to achieve the target input torque profile for the inertia phase.

In at least one embodiment, a synchronous automatic transmission is provided. The transmission includes an input shaft connectable to an engine via a torque converter, an output shaft, and gearing defining multiple torque flow paths from the input shaft to the output shaft. The transmission further includes an off-going clutch ("OGC") and an on-coming clutch ("OCC") for shifting from a low gear configuration to a high gear configuration during a ratio up-shift event having a preparatory phase, a torque phase, and an inertia phase. The transmission further includes an input torque sensor in communication with the input shaft and configured to measure input torque during the up-shift event. The transmission further includes a controller in communication with the OGC, the OCC, the engine, and the input torque sensor. The controller is configured to: determine a target input torque profile for the torque phase and a target input torque profile for the inertia phase each based on the input torque measured during the preparatory phase; during the torque phase, control an engine torque to cause the input torque to achieve the target input torque profile for the torque phase; and during the inertia phase, control the OCC to cause the input torque to achieve the target input torque profile for the inertia phase.

In at least one embodiment, a method is provided. The method includes measuring input torque during an up-shift having preparatory, torque, and inertia phases. The method includes determining target input torque profiles for the torque and inertia phases based on the input torque during the preparatory phase. The method includes, during the torque phase, controlling an engine torque to cause the input torque to achieve the target profile for the torque phase. The method includes, during the inertia phase, controlling an on-coming clutch to cause the input torque to achieve the target profile for the inertia phase.

BRIEF DESCRIPTION OF THE DRAWINGS

FIG. 1 illustrates a schematic representation of a conventional multiple-ratio synchronous automatic transmission in a low gear configuration;

FIG. 2 illustrates a schematic representation of the conventional transmission in a high gear configuration;

DETAILED DESCRIPTION

Figure 3:
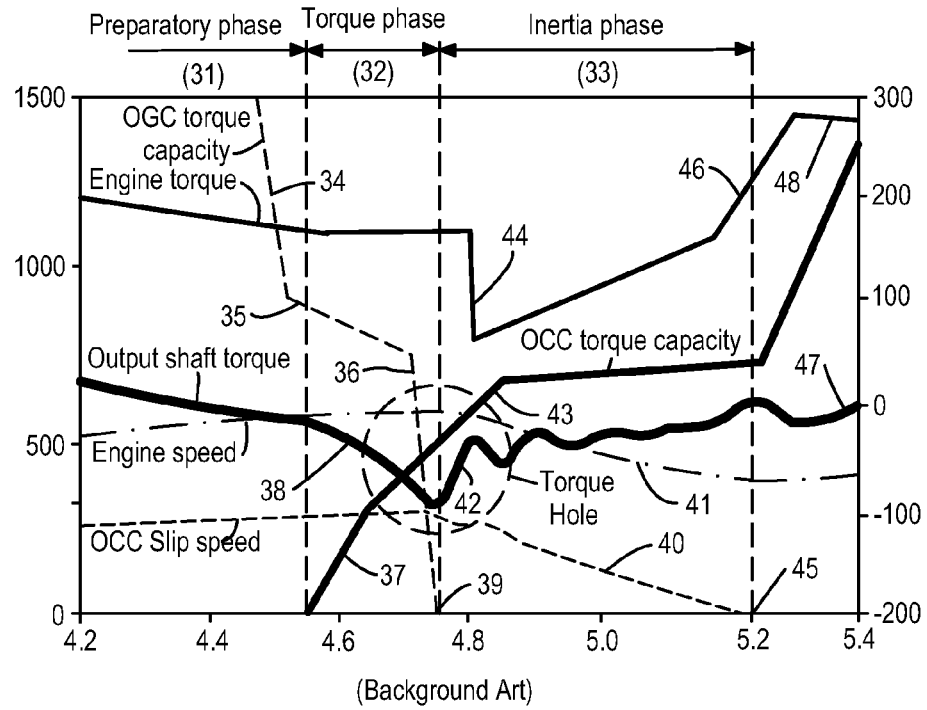
FIG. 3 illustrates a plot of a synchronous up-shift event with a constant engine throttle setting according to a conventional up-shift control method for the conventional transmission.

Detailed embodiments of the present invention are disclosed herein; however, it is to be understood that the disclosed embodiments are merely exemplary of the present invention that may be embodied in various and alternative forms. The figures are not necessarily to scale, some features may be exaggerated or minimized to show details of particular components. In addition, any or all features from one embodiment may be combined with any other embodiment. Therefore, specific structural and functional details disclosed herein are not to be interpreted as limiting, but merely as a representative basis for the claims and/or as a representative basis for teaching one skilled in the art to variously employ the present invention.

As indicated, the shifting of a multiple-ratio (i.e., step-ratio) automatic transmission is accompanied by applying and/or releasing friction elements (such as plate clutches, band-brakes, etc.) which change speed and torque relationships by altering planetary gear configurations. The friction elements may be actuated hydraulically, mechanically, or through other means. A realizable combination of planetary gear configurations determines a total number of ratio steps. Although various planetary gear configurations are used in automatic transmissions, the basic principle of shift kinematics is similar.

During a typical synchronous clutch-to-clutch up-shift event from a lower gear configuration to a higher gear configuration, both the gear ratio (the transmission input shaft speed/transmission output shaft speed) and the torque ratio (the transmission output shaft torque/transmission input shaft torque) become lower. During the up-shift event, a friction element (i.e., the off-going clutch ("OGC")) associated with the lower gear configuration disengages while a different friction element (i.e., the on-coming clutch ("OCC")) associated with a higher gear configuration engages.

An embodiment of the present invention provides a closed-loop control method which eliminates or reduces torque holes while de-coupling engine control from transmission control based on measured or estimated transmission input torque signals. The control method is intended to reduce the complexity of up-shift control for improved shift consistency and control robustness. The control method is further intended to deliver a consistent and improved shift quality while reducing shift calibration requirements.

Referring now to FIGS. 1 and 2, schematic representations of a conventional multiple-gear (i.e., step-gear) synchronous automatic transmission 10 in an automotive powertrain are shown. As explained in greater detail below, transmission 10 has a low gear configuration in FIG. 1 and a high gear configuration in FIG. 2.

Although the powertrain shown in FIGS. 1 and 2 includes a torque converter 14 at the torque input side of transmission 10, the present invention can be used as well in a hybrid powertrain that includes, for example, an engine and an electric motor without a torque converter. In a hybrid configuration, the power of the engine is complemented by the power generated electrically by the motor. Further, the specific gearing arrangement illustrated in FIGS. 1 and 2 can be replaced by other gearing arrangements that establish multiple torque flow paths from a power source (e.g., engine 11) to an output shaft 13.

The powertrain shown in FIGS. 1 and 2 includes an internal combustion engine 11. The torque output side of engine 11 is hydro-kinetically coupled to a simple planetary gear set 12 of a multiple ratio transmission mechanism by a hydro-kinetic torque converter 14. Torque is delivered by a torque converter turbine to ring gear 15 of gear set 12. Sun gear 16, which is grounded, acts as a reaction element as torque is delivered by a planetary carrier for pinions 17, which engage ring gear 15 and sun gear 16.

A compound planetary gear set 18 includes a ring gear 19, which is driveably connected to an output shaft 13. Sun gear 20 acts as a torque input element for gear set 18. A second sun gear 21 engages long planet pinions 22, which in turn engage ring gear 19 and short pinions 23. Sun gear 20 also engages pinions 23.

The pinions form a compound pinion assembly supported on carrier 24, which can be selectively braked by brake 25, which is identified in FIGS. 1 and 2 as clutch #2 (i.e., off-going clutch ("OGC") 25). Sun gear 21 can be selectively braked by friction brake 26, which is identified in FIGS. 1 and 2 as clutch #1 (i.e., on-coming clutch ("OCC") 26).

As indicated, conventional transmission 10 has a low gear configuration in FIG. 1 and a high gear configuration in FIG. 2. In the low gear configuration, OGC 25 acts as a reaction point for compound planetary gear set 18. The torque flow path in the powertrain is indicated in FIG. 1 by heavy directional lines. Torque is delivered during low gear operation from simple planetary gear set 12 to sun gear 20 of compound planetary gear set 18. Ring gear 19 delivers driving torque to output shaft 13.

During a synchronous up-shift from the low gear configuration to the high gear configuration, OGC 25 is released and OCC 26 is applied. At this time, sun gear 21 is braked by OCC 26. OCC 26 functions as a reaction point for compound planetary gear set 18. During this up-shift from a low to high gear configuration, both the gear ratio and the torque ratio become lower.

In sum, FIG. 1 illustrates transmission 10 in a low gear configuration with high torque ratio. In the low gear configuration, OCC 26 (e.g., the high ratio clutch) is disengaged and OGC 25 (e.g., the low ratio clutch) is engaged. As a result, carrier 24 of pinions 22 of compound planetary gear set 18 is grounded, enabling torque transmission from sun gear 21 to output shaft 13 at a high torque ratio. FIG. 2 illustrates transmission 10 in a high gear configuration with low torque ratio. OCC 26 is engaged and OGC 25 is disengaged. As a result, sun gear 21 is grounded enabling torque transmission from sun gear 21 to output shaft 13 at low torque ratio.

Referring now to FIG. 3, with continual reference to FIGS. 1 and 2, a plot of a synchronous up-shift event from the low gear configuration to the high gear configuration with a constant engine throttle setting according to a conventional up-shift control method for conventional transmission 10 is shown. The variables plotted in FIG. 3 are characteristic of a conventional synchronous up-shift control method. Vehicle speed can be considered to approximately constant during the shift due to its short duration.

The synchronous up-shift event of FIG. 3 is divided into three phases: preparatory phase 31, torque phase 32, and inertia phase 33. Torque phase 32 is a time period when torque capacity of OGC 25 is controlled to decrease toward a value of zero for its disengagement. Preparatory phase 31 is a time period prior to torque phase 32. Inertia phase 33 is a time period when OGC 25 starts to slip, following torque phase 32. During preparatory phase 31, the torque capacity of OGC 25 is reduced, as shown at 34, to prepare for its release. OGC 25 maintains enough torque capacity, however, to keep it from slipping at this time, as shown at 35. During preparatory phase 31, stroking of OCC 26 takes place, without assuming a significant torque capacity, to prepare for its engagement. During torque phase 32, the torque capacity of OGC 25 is further reduced toward zero with an intention to disengage it, as shown at 36, while torque capacity of OCC 26 is raised, as shown at 37. At this point, OGC 25 is still engaged without slipping, thereby maintaining the planetary gear set in the low gear configuration. The increasing torque capacity of OCC 26, however, reduces the net torque flow within the gear set. The output shaft torque, therefore, drops significantly as shown at 38 during torque phase 32, creating a torque hole.

Torque phase 32 ends and inertia phase 33 begins when OGC 25 starts slipping, as shown at 39. OGC 25 may slip before its capacity reaches zero or a non-significant level, as shown at 39, if the load exerted onto OGC 25 exceeds its torque-holding capacity. During inertia phase 33, OGC 25 slip speed rises (not shown) while OCC 26 slip speed decreases toward zero, as shown at 40 and 45. The engine speed drops, as shown at 41, as the planetary gear configuration changes. During inertia phase 33, the output shaft torque is primarily affected by OCC 26 torque capacity. This causes the output torque to rapidly move to level 42, which corresponds to OCC torque capacity 43 at the beginning of inertia phase 33. Under certain conditions, this may lead to a large torque oscillation at output shaft 13 that can be perceptible to a vehicle occupant as an unpleasant shift shock.

FIG. 3 shows a reduced engine torque as shown at 44 during inertia phase 33. This is caused by engine torque truncation by engine spark timing retard, which is a common method for reducing engine torque during inertia phase 33 of shifting to enable OCC 26 to engage within a target time without requiring excessive torque capacity. When OCC 26 completes its engagement, or when its slip speed becomes zero as shown at 45, inertia phase 33 ends. The engine torque truncation is removed, as shown at 46, and the output shaft torque returns to the level 47, which corresponds to a given engine torque level 48 (more precisely, a transmission input torque level). Note that the engine torque is raised to level 48 which is higher than its level during preparatory phase 31. This may be enabled by throttle control, spark control, or any other means, including an auxiliary torque augmenting device, to achieve the similar torque level at output shaft 13 before and after the shift event.

Figure 4:
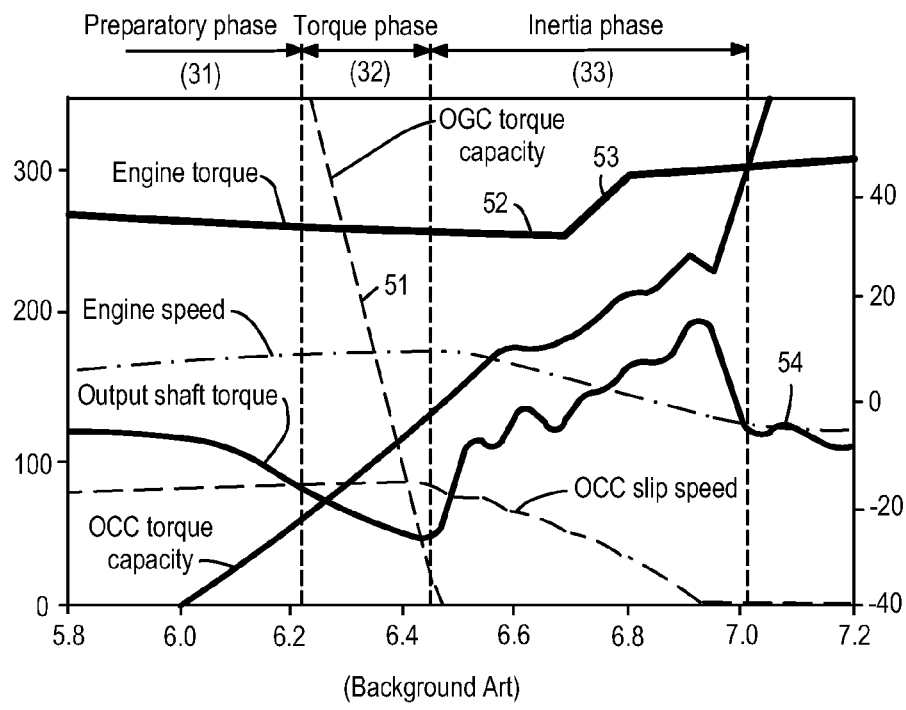
FIG. 4 illustrates a plot of a synchronous up-shift event according to another conventional up-shift control method for the conventional transmission.

Referring now to FIG. 4, a plot of a synchronous up-shift event from the low gear configuration to the high gear configuration according to another conventional up-shift control method for conventional transmission 10 is shown. During torque phase 32, the OGC torque capacity is purposely reduced toward zero following a different profile 51 than the corresponding profile in the plot of FIG. 3. The engine torque truncation is not required during inertia phase 33 because of a lower engine torque level as shown at 52. In fact, the engine torque is raised to level 53 during inertia phase 33 in order to prevent a significant loss of torque at output shaft 13 after up-shifting as shown at 54.

Figures 5, 6:
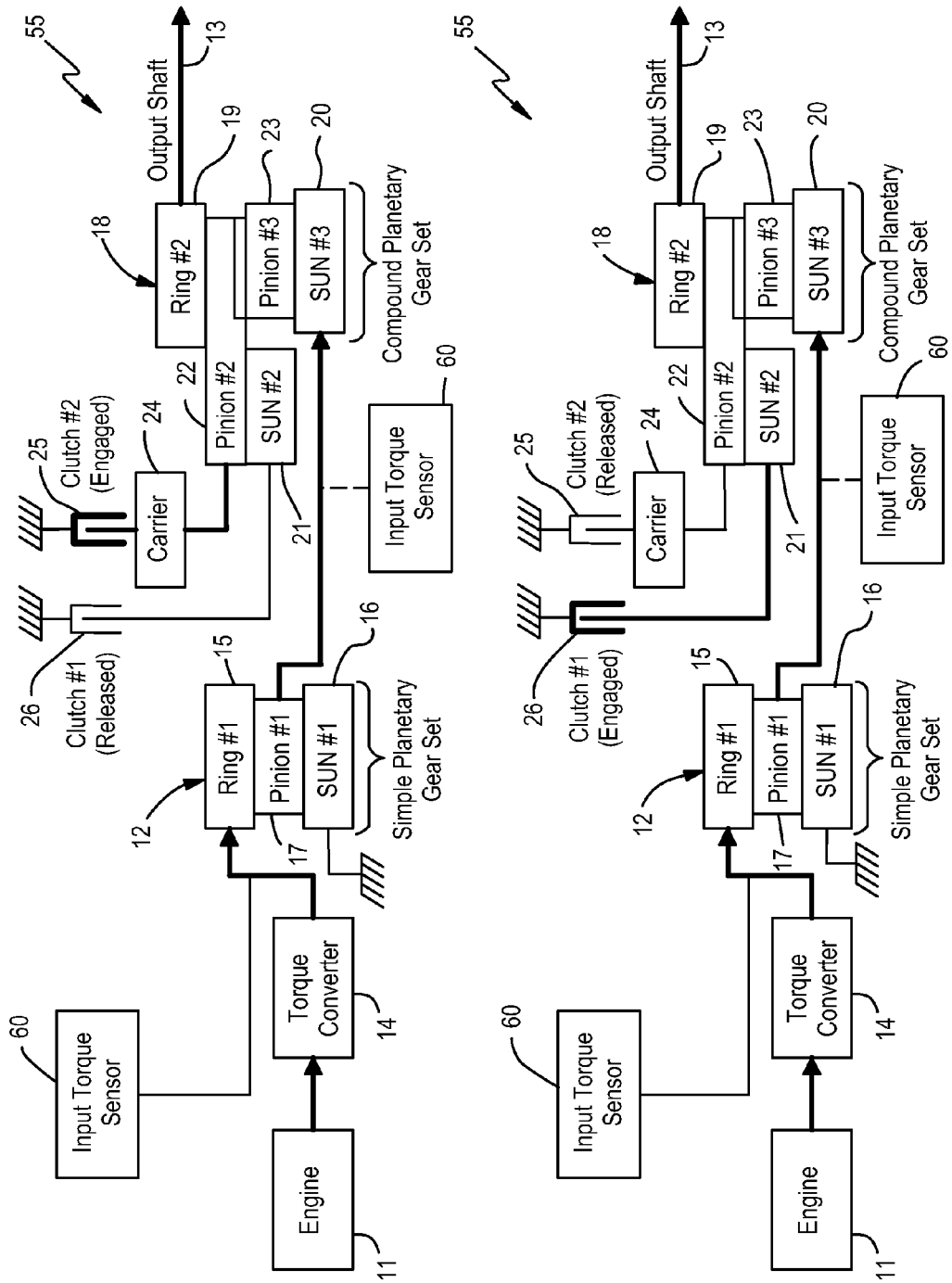
FIG. 5 illustrates a schematic representation of a multiple-ratio synchronous automatic transmission in accordance with an embodiment of the present invention in a low gear configuration.
FIG. 6 illustrates a schematic representation of the automatic transmission shown in FIG. 5 in a high gear configuration.

Referring now to FIGS. 5 and 6, schematic representations of a multiple-gear synchronous automatic transmission 55 in accordance with an embodiment of the present invention are shown. As explained in greater detail below, transmission 55 has a low gear configuration in FIG. 5 and a high gear configuration in FIG. 6.

Transmission 55 is the same as conventional transmission 10 shown in FIGS. 1 and 2 with the exception that transmission 55 further includes an input torque sensor 60 at the input shaft. Alternatively, input torque sensor 60 may be placed at a different location as shown in FIGS. 5 and 6. Input torque sensor 60 may be a strain-gauge base system, a force-resistive elastomer sensor, a piezoelectric load cell, or a magneto-elastic torque sensor. In a preferred embodiment, input torque sensor 60 is a magneto-elastic torque sensor as described in U.S. Pat. Nos. 6,145,387; 6,047,605; 6,553,847; and 6,490,934. Such magneto-elastic torque sensors enable accurate measurements of torque exerted onto a rotating shaft without requiring a physical contact between a magnetic flux sensing element and the shaft. It should be understood that input torque sensor 60 can be positioned differently from that in FIGS. 5 and 6, depending on a kinematic arrangement and sensor packageability for a given transmission system, in order to implement the up-shift control methods of the present invention.

Figure 7:
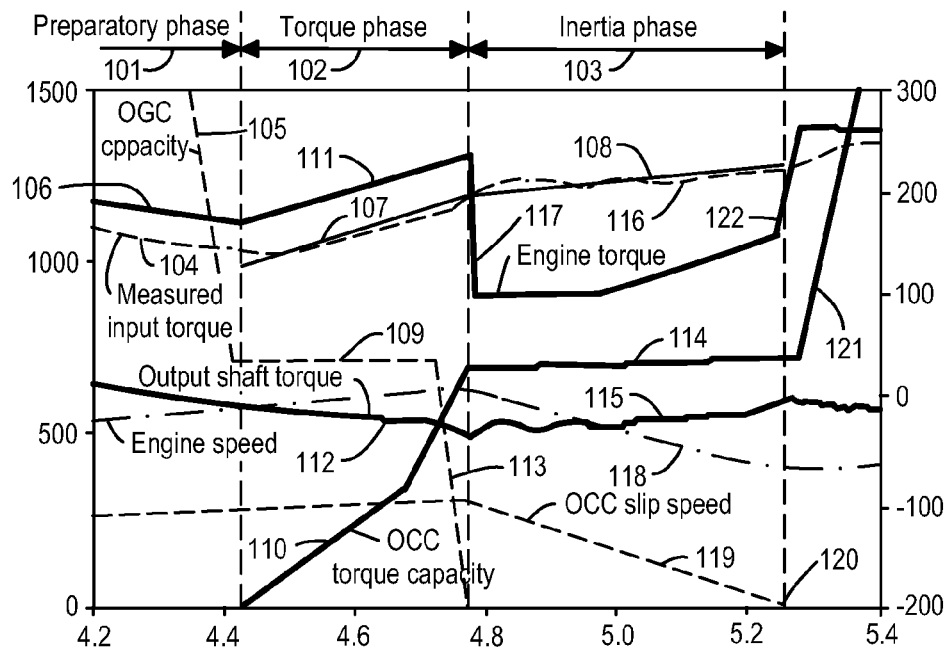
FIG. 7 illustrates a plot of a synchronous up-shift event according to an up-shift control method in accordance with an embodiment of the present invention for the automatic transmission shown in FIGS. 5 and 6.

Referring now to FIG. 7, with continual reference to FIGS. 5 and 6, a plot of a synchronous up-shift event from the low to high gear configuration according to an up-shift control method in accordance with an embodiment of the present invention for transmission 55 is shown. The plot of FIG. 7 is in regards to an up-shift control sequence provided by the up-shift control method for transitioning transmission 55 from the low to high gear configuration.

A powertrain controller (illustrated with reference to FIG. 12) carries out the steps of the up-shift control method. Throughout the up-shift event, input torque sensor 60 measures the transmission input torque at a fixed or variable sampling rate (for instance, as shown at 104). Input torque sensor 60 provides the input torque signal to the controller. In turn, the controller uses the input torque signal in carrying out the steps of the up-shift control method.

Again, the up-shift event is divided into three phases: a preparatory phase 101, a torque phase 102, and an inertia phase 103. During preparatory phase 101, the controller initiates a command to stroke OCC 26 to prepare for its engagement while reducing torque capacity of OGC 25, as shown at 105, as a step toward its release. The controller increases engine torque reserve or transmission input torque reserve in a controlled manner without significantly raising engine torque output, as shown at 106, and input torque 104. Herein, engine torque reserve is defined as the amount of accessible torque that can be readily drawn as required during torque phase 102. This may be achieved by increasing engine throttle while retarding spark timing simultaneously in a controlled manner based on the measured input torque feedback. Alternatively, other means such as electronic valve timing control and a turbo charger control may be utilized to increase engine torque reserve or transmission input torque reserve.

A control algorithm constructs a target input torque profile 107 for torque phase 102 and a target input torque profile 108 for inertia phase 103 based on the input torque measurements during preparatory phase 101. During torque phase 102, the controller maintains OGC torque capacity at a reduced level without OGC slipping, as shown at 109, while increasing OCC torque capacity, as shown at 110.

The OGC and OCC controls may be performed based on an open-loop approach to achieve a prescribed torque profile. Alternatively, the OGC and OCC controls may be based on a closed loop approach. If OGC release control is based on an open loop method, it is advantageous to calibrate control parameters to induce a slight gear-set tie-up. According to a conventional control, a tie-up leads to a wider and deeper torque hole with inconsistent shift feel.

However, in accordance with embodiments of the present invention, the controller taps into engine torque reserve and adjusts engine output torque during torque phase 102, as shown at 111, by engine spark timing or other means to achieve target input torque profile 107, thereby eliminating or reducing a torque hole during torque phase 102, shown with reference to 112, even with a gear-set tie-up. Alternatively, an auxiliary electronic motor may be used to supplement engine torque to achieve a target transmission input torque level. At the end of torque phase 102, OGC torque capacity is dropped toward zero for its release, as shown at 113. When OGC 25 starts slipping (not shown), torque phase 102 ends and inertia phase 103 begins.

During inertia phase 103, OCC torque capacity 114 primarily affects output shaft torque 115 and input shaft torque 116. The controller adjusts the actuator of OCC 26 to achieve target input torque profile 108 through a close loop control based on input torque measurements during inertia phase 103, as shown at 116. The controller may truncate the engine torque during inertia phase 103, as shown at 117, according to a conventional engine control practice. An effect of engine torque variability on input and output shaft torque (more specifically, inertia torque variability) can be eliminated by a closed-loop OCC torque control designed to achieve a target input torque profile. During inertia phase 103, the engine speed decreases, as shown at 118, as OCC slip speed drops, as shown at 119. When OCC 26 is securely engaged, as shown at 120, the up-shift event completes. The controller raises OCC torque capacity, as shown at 121, for securely holding OCC 26 while removing engine torque truncation, as shown at 122.

Figure 8:
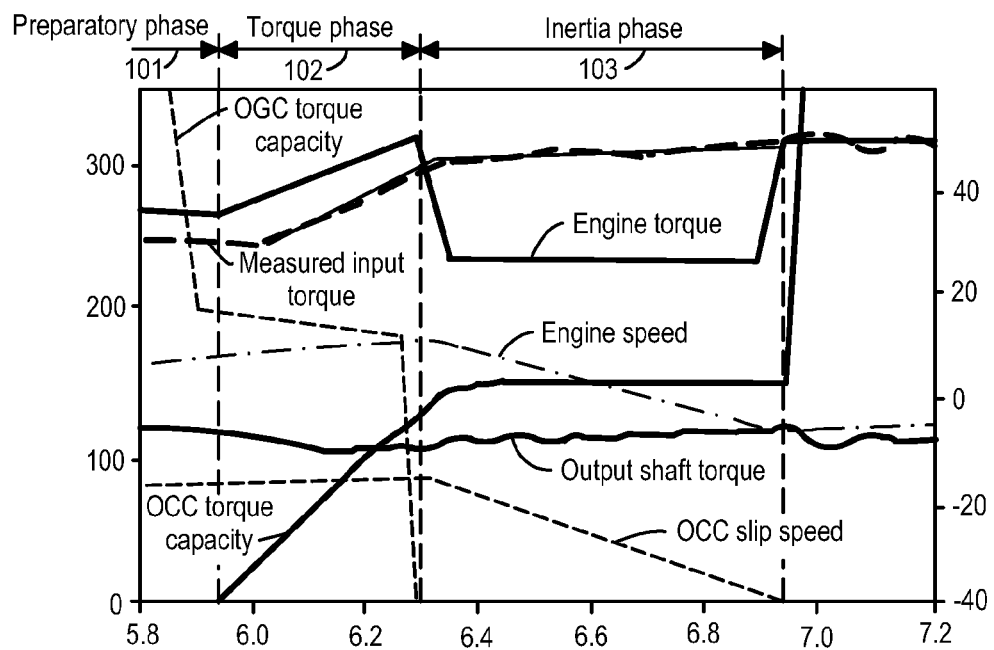
FIG. 8 illustrates a plot of a synchronous up-shift event according to the up-shift control method in accordance with an embodiment of the present invention at a lower throttle position.

Referring now to FIG. 8, with continual reference to FIG. 7, a plot of a synchronous up-shift event from the low to high gear configuration according to the up-shift control method at a lower throttle position is shown. As can be seen from a comparison of FIGS. 7 and 8, the overall control sequence of FIG. 8 is similar to that of FIG. 7.

Figure 9:
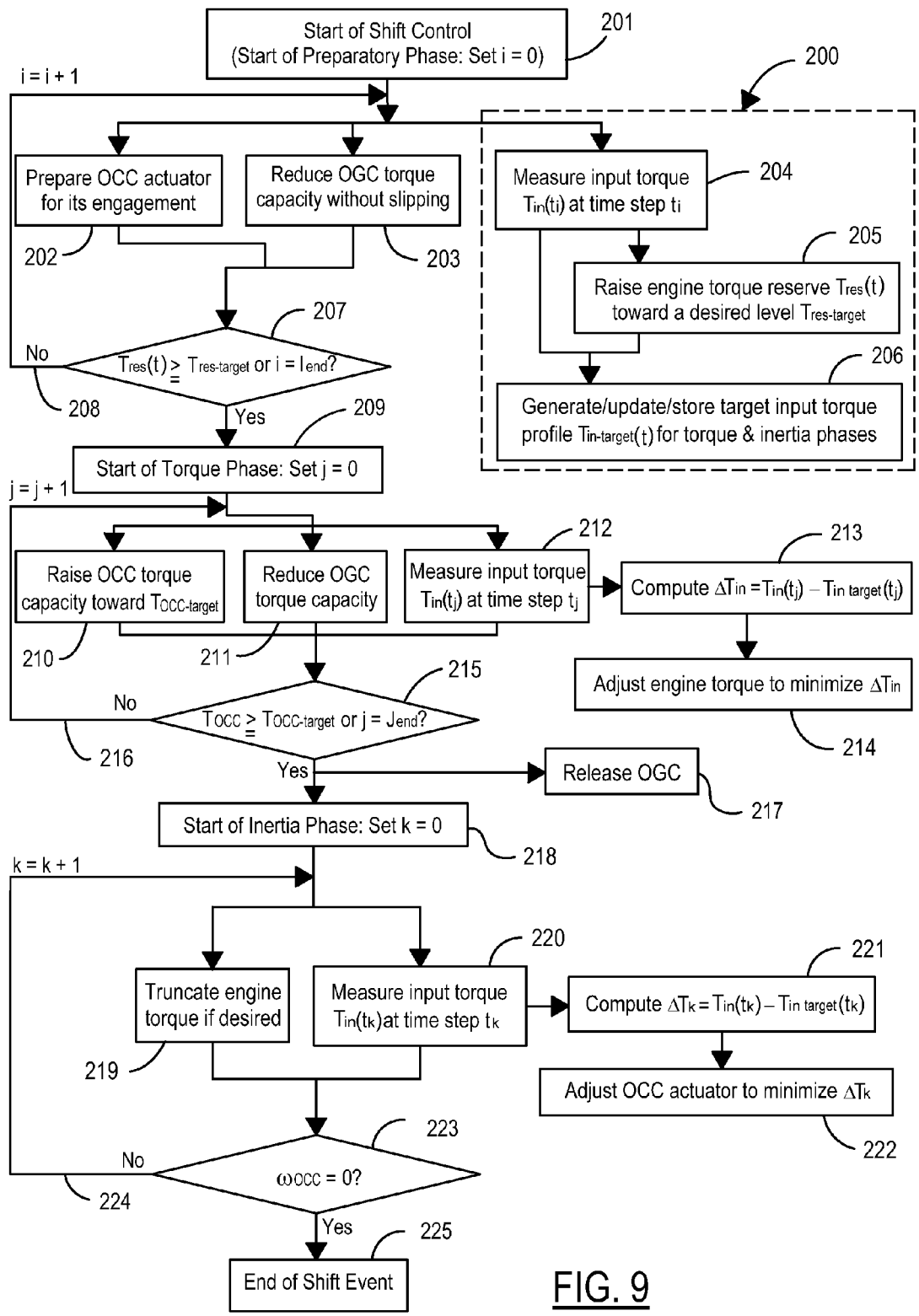
FIG. 9 illustrates a flowchart describing the control sequence operation of the up-shift control method in accordance with an embodiment of the present invention.

Referring now to FIG. 9, with continual reference to FIGS. 5, 6, 7, and 8, a flowchart describing the control sequence operation of the up-shift control method in accordance with an embodiment of the present invention is shown.

The control sequence begins with the powertrain controller initiating a shift event and defining the start of the preparatory phase (i.e., setting i=0) as shown in block 201. The controller then prepares the actuator of the OCC for its engagement as shown in block 202 while reducing OGC torque capacity without slipping as shown in block 203. Input torque sensor 60 measures transmission input torque at every control time step i or at time $t_i$ and provides the corresponding input torque signal indicative of the measured transmission input torque to the controller as shown in block 204. The controller raises engine torque reserve $T_{res}$ toward a desired level $T_{res\text{-}target}$ while maintaining a steady transmission input torque level through a closed loop control based on measured input torque $T_{in}(t_i)$ as shown in block 205. The desired level $T_{res\text{-}target}$ is determined based on engine operating conditions. The controller generates a target input torque profile $T_{in\text{-}target}(t)$ for both the torque phase and the inertia phase based on available engine torque reserve $T_{res}(t_i)$ and input torque measurements $T_{in}(t_i)$ as shown in block 206.

As described, the controller generates the target input torque profile $T_{in\text{-}target}(t)$ for both the torque and inertia phases according to a control algorithm provided by blocks 204, 205, and 206. The control algorithm is indicated by block 200 which encompasses blocks 204, 205, and 206. This control algorithm will be described in greater detail below with reference to FIG. 10 which illustrates a flowchart describing the operation of the control algorithm.

The controller determines the end of the preparatory phase when $T_{res}(t_i)$ reaches $T_{res\text{-}target}$ or when i reaches a pre-calibrated time interval $I_{end}$ as shown in block 207. The controller iterates the control loop as shown at 208 until the conditions in block 207 are met. When the preparatory phase ends (i.e., when the conditions in block 207 are met), the control sequence moves to the start of the torque phase and the controller sets the control loop index j to 0 as shown in block 209. The controller raises OCC torque capacity toward a pre-determined target level $T_{OCC\text{-}target}$ for its engagement as shown in block 210 while further reducing OGC torque capacity with or without slipping as shown in block 211. If OGC 25 is allowed to slip, it needs to maintain enough capacity to allow only an incipient slip level. Input torque level $T_{in}(t_j)$ is measured by input torque sensor 60 at each control time step j or at time $t_j$ as shown in block 212. The controller computes the difference $\Delta T_{in}$ between the measured input torque $T_{in}(t_i)$ and the target input torque profile $T_{in\text{-}target}(t)$ as shown in block 213. Subsequently, the controller adjusts the engine torque level through spark timing control or other means such as the use of an auxiliary electric motor to minimize the error $\Delta T_{in}$ through a closed loop control as shown in block 214.

The controller determines the end of the torque phase when the OCC torque capacity $T_{OCC}$ assumes the pre-determined target level $T_{OCC\text{-}target}$ or when j reaches a pre-determined time interval $J_{end}$ as shown in block 215. The OCC torque capacity $T_{OCC}$ can be determined based on torque estimation algorithms. Alternatively, the torque phase ends when the load exerted on OGC 25 approaches zero.

As previously mentioned, a detrimental effect of mild gear-set tie-up, such as a deeper and wider torque hole, is mitigated by actively maintaining input torque level $T_{in}(t)$ at a desired target level $T_{in\text{-}target}(t)$. Therefore, unlike a conventional clutch-to-clutch control method, the control method in accordance with the present invention does not require a precise synchronization of OCC torque level and OGC release timing for consistent shift quality as long as they are calibrated toward gear-set tie-up.

The controller iterates the control loop beginning from block 215 as shown at 216 until the end-of-torque phase conditions in block 215 are met. When the torque phase ends (i.e., when the conditions in block 215 are met), the control sequence moves to the start of the inertia phase and OGC 25 is totally released as shown in block 217.

At the start of the inertia phase, the controller sets its time step index k to 0 as shown in block 218. The controller may modulate or truncate the engine torque according to a conventional engine control practice during the inertia phase as shown in block 219 in order to complete OCC engagement within a targeted inertia phase duration. The controller continues to collect from input torque sensor 60 input torque measurements $T_{in}(t_k)$ at every control time step $t_k$ as shown in block 220. The controller computes the error $\Delta T_k$ between the measured input torque $T_{in}(t_k)$ and the target input torque profile $T_{in\text{-}target}(t_k)$ as shown in block 221. The controller adjusts the actuator of OCC 26 to reduce the error $\Delta T_k$ in a closed loop manner as shown in block 222. Until OCC slip speed $\omega_{OCC}$ reaches zero as shown in block 223, the controller iterates the control loop as shown at 224. When the inertia phase ends, the controller removes engine torque truncation and raises OCC torque capacity for securely locking OCC 26 to complete the shift control sequence as shown in block 225.

Figure 10:
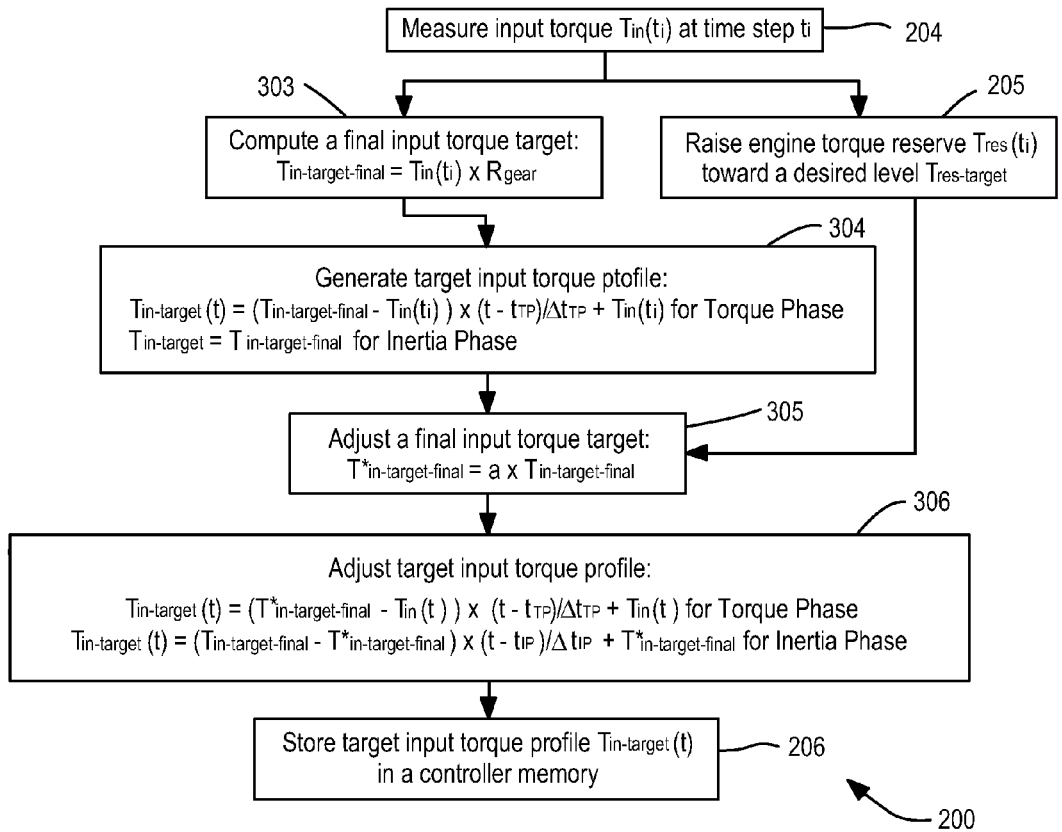
FIG. 10 illustrates a flowchart describing operation of a control algorithm of the up-shift control method in which the control algorithm is for generating a target transmission input shaft torque profile for each of the torque and inertia phases.

Referring now to FIG. 10, with continual reference to FIG. 9, a flowchart describing operation of the control algorithm for generating a target transmission input shaft torque profile $T_{in\text{-}target}(t)$ for each of the torque and inertia phases is shown. As indicated above, the control algorithm is designated as block 200 in FIG. 9 and encompasses blocks 204, 205, and 206 of FIG. 9.

In operation, the controller samples a transmission input torque measurement from input torque sensor 60 at every control time step i or at time $t_i$ as shown in block 204. The controller raises engine torque reserve $T_{res}(t_i)$ toward a desired torque level $T_{res\text{-}target}$ while maintaining a steady transmission input torque level through a closed loop control based on the measured input torque $T_{in}(t_i)$ as shown in block 205. Specifically, the controller maintains the input torque $T_{in}(t_{i+1})$ within $T_{in}(t_i)+\Delta T_{in}(t_i)$, where $\Delta T_{in}$ is a pre-determined threshold parameter. The desired torque level $T_{res\text{-}target}$ is determined based on engine operating conditions.

As indicated by block 303, the controller generates a final input torque target $T_{in\text{-}target\text{-}final}$ by multiplying $T_{in}(t_i)$ by a pre-determined gear ratio $R_{gear}$ where $R_{gear}$ is associated with the gear ratio changing. The controller constructs the target input torque profile $T_{in\text{-}target}(t)$ for the torque phase by raising the torque level linearly from the current level $T_{in}(t_i)$ to the final target $T_{in\text{-}target\text{-}final}$ between $t_{TP}$ and $t_{IP}$ (or over the torque phase $\Delta t_{TP}$) as shown in block 304, where $t_{TP}$ and $t_{IP}$ are the beginning of the torque phase and the inertia phase, respectively. The controller maintains the target input torque profile $T_{in\text{-}target}(t)$ for the inertia phase at the final target $T_{in\text{-}target\text{-}final}$ during the inertia phase $\Delta t_{IP}$ as shown in block 304.

It is noted that the beginning of the torque phase $t_{TP}$ is dynamically adjusted at every control time step depending on when the preparatory phase ends. Further, the torque phase $\Delta t_{TP}$ and the inertia phase $\Delta t_{IP}$ may be determined based on desired target intervals.

The engine torque reserve $T_{res}(t_i)$ may not achieve its desired target $T_{res\text{-}target}(t_i)$ at the end of the preparatory phase. In this case, the controller re-calculates the final input torque target $T^*_{in\text{-}target\text{-}final}$ based on $T_{res}(t_i)$ as shown in block 305, were "a" is a scaling parameter.

The controller re-constructs a target input torque profile $T_{in\text{-}target}(t)$ for the torque phase by increasing the torque level linearly from $T_{in}(t_i)$ to the final target $T^*_{in\text{-}target\text{-}final}$ as shown in block 306. The controller re-constructs a target input torque profile $T_{in\text{-}target}(t)$ for the inertia phase by increasing the torque level linearly from $T^*_{in\text{-}target\text{-}final}$ to $T_{in\text{-}target\text{-}final}$ over $\Delta t_{IP}$ as shown in block 306. The target input torque profile $T_{in\text{-}target}(t)$ is stored in a memory of the controller as shown in block 206 to enable input-torque based shift control according to the present invention.

Figure 11:
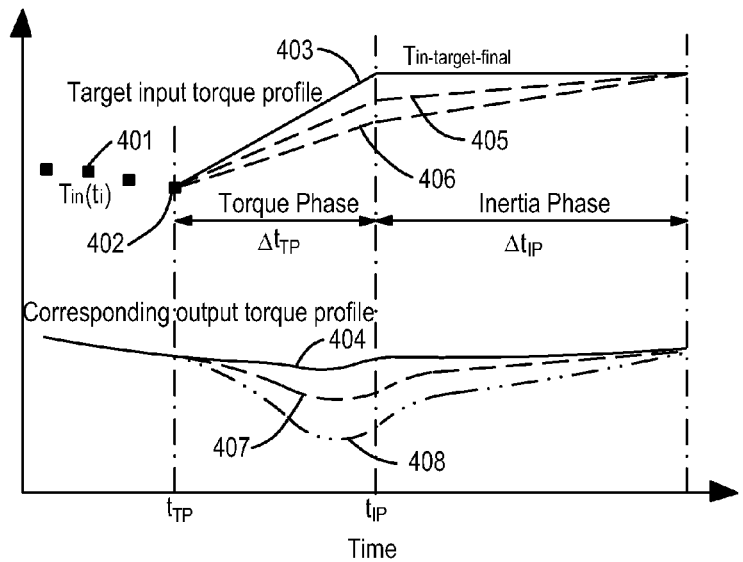
FIG. 11 illustrates a plot that demonstrates target input torque profiles and resulting output torque profiles according to the up-shift control method in accordance with an embodiment of the present invention.

Referring now to FIG. 11, a plot that demonstrates target input torque profiles and resulting output torque profiles according to the up-shift control method in accordance with an embodiment of the present invention is shown. During the preparatory phase, input torque is measured using input torque sensor 60 as indicated at 401. The last input torque measurement $T_{in}(t_{TP})$ during the preparatory phase is noted at 402. Based on $T_{in}(t_{TP})$, a target input torque profile is constructed for both the torque phase and the inertia phase without truncating $T_{in\text{-}target\text{-}final}$ as indicated at 403. When a controller follows this input target profile 403 using the control sequence of the up-shift control method in accordance with an embodiment of the present invention, the output torque profile 404 remains flat during the torque phase without a torque hole. Input torque profiles are lowered, indicated respectively at 405 and 406, when engine torque reserve is not fully available. This results in a corresponding partially filled torque hole, indicated respectively at 407 and 408.

Figure 12:
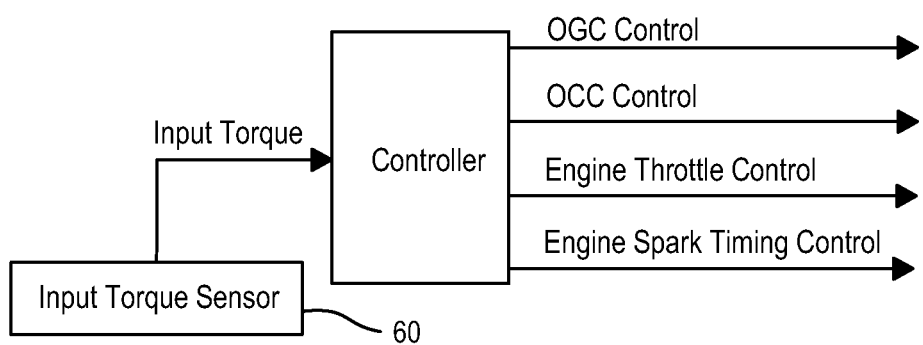
FIG. 12 illustrates a schematic diagram of a powertrain controller in accordance with embodiments of the present invention.

Referring now to FIG. 12, a schematic representation of the controller that would be used in a powertrain in accordance with embodiments of the present invention is shown. The controller includes memory that receives input signals including input torque sensor signals from input torque sensor 60. The controller includes a processor which uses the input signals in execution of appropriate algorithms including pressure command functions, speed functions, and torque functions herein described. The controller distributes appropriate signals to the clutches (OGC 25 and OCC 26) and distributes appropriate engine control signals as shown.

As described, embodiments of the present invention may have the following features and advantages. A unique process to control synchronous clutch-to-clutch up-shift events for a vehicle powertrain system having a step-ratio automatic transmission system equipped with an input shaft torque sensing device and means to increase or supplement engine torque during shifting, including a step-ratio, pre-transmission hybrid electric vehicle. The use of transmission input torque measurements to select a desired input torque profile and to control transmission input torque to achieve the desired input torque profile in a closed loop manner during a synchronous clutch-to-clutch up-shift event. A process to select a desired input torque profile for both torque and inertia phases based on measured input torque during the preparatory phase of up-shifting. A process to increase engine torque through a closed-loop control based on input torque measurements while maintaining a steady input torque level during the preparatory phase. A process to adjust a desired input torque profile for torque and inertia phases based on available engine torque reserve which is created during the preparatory phase of up-shifting. A process to control engine torque in a controlled manner based on error between measured transmission input torque and target input torque profile during the torque phase. A process to control OCC torque in a controlled manner based on error between measured transmission input torque and target input torque level during the inertia phase. A process to eliminate or reduce torque hole for eliminated or reduced shift shock and for increased driving comfort.

Engine torque control and OCC torque capacity are decoupled through the use of input torque measurements. As a result, the detrimental effects of OCC clutch control variability, such as inconsistent shift feel, are eliminated or reduced by maintaining transmission input torque at a desired level through a closed loop engine torque control based on measured input torque. Sensitivity of missed-synchronization between OGC release timing from OCC torque capacity level is reduced. As a result, any detrimental effects of mild gear-set tie-up, such as a deeper and wider torque hole, are eliminated or reduced by maintaining transmission input torque at a desired level though a closed loop engine torque control based on measured input torque.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention. For example, engine torque reserve may be readily supplemented by an auxiliary electric motor.

What is claimed:

1. A method for an automatic transmission having gearing defining multiple torque flow paths from an input shaft to an output shaft and further having an off-going clutch ("OGC") and an on-coming clutch ("OCC") for shifting from a low gear configuration to a high gear configuration during a ratio up-shift event having a preparatory phase, a torque phase, and an inertia phase, the method comprising:
   during the up-shift event, measuring input torque using an input torque sensor in communication with the input shaft;
   determining a target input torque profile for the torque phase and a target input torque profile for the inertia phase each based on the input torque measured during the preparatory phase;
   during the torque phase, controlling an engine torque to cause the input torque to achieve the target input torque profile for the torque phase; and
   during the inertia phase, controlling the OCC to cause the input torque to achieve the target input torque profile for the inertia phase.

2. The method of claim 1 wherein:
the input torque sensor is a magneto-elastic torque sensor.

3. The method of claim 1 wherein:
controlling the engine torque to cause the input torque to achieve the target input torque profile for the torque phase includes using a closed loop control based on the input torque measured during the torque phase.

4. The method of claim 1 wherein:
controlling the OCC to cause the input torque to achieve the target input torque profile for the inertia phase includes using a closed loop control based on the input torque measured during the inertia phase.

5. The method of claim 1 wherein:
causing the input torque to achieve the target input torque profile for the torque phase includes controlling at least one of engine spark timing, turbo-charging, fuel injection, electronic valve timing, and an electric motor.

6. The method of claim 1 further comprising:
during the preparatory phase, reducing torque capacity of the OGC without slipping and stroking the OCC to prepare the OCC for engagement; and
during the torque phase, further reducing the torque capacity of the OGC until disengagement and raising the torque capacity of the OCC for engagement.

7. The method of claim 6 further comprising:
during the inertia phase, truncating the engine torque in order to complete engagement of the OCC within a targeted inertia phase duration.

8. The method of claim 1 further comprising:
during the preparatory phase, increasing an engine torque reserve to a pre-identified engine torque reserve level while preventing significant changes in the input torque during the preparatory phase.

9. The method of claim 8 wherein:
increasing the engine torque reserve to the pre-identified engine torque reserve level while preventing significant changes in the input torque during the preparatory phase includes using a closed-loop control based on the input torque measured during the preparatory phase.

10. The method of claim 8 wherein:
increasing the engine torque reserve to the pre-identified engine torque reserve level while preventing significant changes in the input torque during the preparatory phase includes controlling at least one of engine throttle, engine spark timing, turbo-charging, fuel injection, and electronic valve timing based on the input torque measured during the preparatory phase.

11. The method of claim 8 wherein:
the target input torque profiles for the torque and inertia phases are each based on the input torque measured during the preparatory phase and the engine torque reserve.

12. The method of claim 8 wherein:
the pre-identified engine torque reserve level is based on engine operating conditions.

13. A synchronous automatic transmission comprising:
an input shaft connectable to an engine via a torque converter;
an output shaft;
gearing defining multiple torque flow paths from the input shaft to the output shaft;
an off-going clutch ("OGC") and an on-coming clutch ("OCC") for shifting from a low gear configuration to a high gear configuration during a ratio up-shift event having a preparatory phase, a torque phase, and an inertia phase;
an input torque sensor in communication with the input shaft and configured to measure input torque during the up-shift event; and
a controller in communication with the OGC, the OCC, the engine, and the input torque sensor, the controller configured to:

determine a target input torque profile for the torque phase and a target input torque profile for the inertia phase each based on the input torque measured during the preparatory phase;

during the torque phase, control an engine torque to cause the input torque to achieve the target input torque profile for the torque phase; and during the inertia phase, control the OCC to cause the input torque to achieve the target input torque profile for the inertia phase.

14. The transmission of claim 13 wherein:
the input torque sensor is a magneto-elastic torque sensor.

15. The transmission of claim 13 wherein:
the controller is further configured to control the engine torque to cause the input torque to achieve the target input torque profile for the torque phase using a closed loop control based on the input torque measured during the torque phase;

the controller is further configured to control the OCC to cause the input torque to achieve the target input torque profile for the inertia phase includes using a closed loop control based on the input torque measured during the inertia phase.

16. The transmission of claim 13 wherein:
the controller is further configured to control at least one of engine spark timing, turbo-charging, fuel injection, electronic valve timing, and an electric motor to cause the input torque to achieve the target input torque profile for the torque phase.

17. The transmission of claim 13 wherein:
the controller is further configured to reduce torque capacity of the OGC without slipping and stroke the OCC to prepare the OCC for engagement during the preparatory phase;

the controller is further configured to further reduce the torque capacity of the OGC until disengagement and raise the torque capacity of the OCC for engagement during the torque phase;

the controller is further configured to truncate the engine torque in order to complete engagement of the OCC within a targeted inertia phase duration during the inertia phase.

18. The transmission of claim 13 wherein:
the controller is further configured to increase an engine torque reserve to a pre-identified engine torque reserve level while preventing significant changes in the input torque during the preparatory phase;

wherein the target input torque profiles for the torque and inertia phases are each based on the input torque during the preparatory phase and the engine torque reserve.

19. A method comprising:
measuring input torque of a transmission input shaft during an up-shift having preparatory, torque, and inertia phases using a torque sensor at the transmission input shaft;

generating a target input torque profile for the torque phase based on the measured input torque during the preparatory phase;

during the torque phase, controlling an engine torque to cause the input torque to achieve the target profile for the torque phase.

20. The method of claim 19 further comprising:
generating a target input torque profile for the inertia phase based on the measured input torque during the preparatory phase;

during the inertia phase, controlling an on-coming clutch to cause the input torque to achieve the target profile for the inertia phase.

* * * * *